J. M. HORTON.
Stove-Pipe Dampers.

No. 152,492. Patented June 30, 1874.

WITNESSES
F. F. Warner
N. C. Gidley

INVENTOR
James M. Horton

UNITED STATES PATENT OFFICE

JAMES M. HORTON, OF CHICAGO, ILLINOIS.

IMPROVEMENT IN STOVE-PIPE DAMPERS.

Specification forming part of Letters Patent No. 152,492, dated June 30, 1874; application filed January 31, 1874.

*To all whom it may concern:*

Be it known that I, JAMES M. HORTON, of Chicago, in the county of Cook and State of Illinois, have invented a new and useful Improvement in Stove-Pipe Dampers, of which improvement the following is a full, clear, and exact description, which will enable others skilled in the art to which my invention appertains to make and use the same, reference being had to the accompanying drawing forming a part hereof, and in which—

Figure 1:
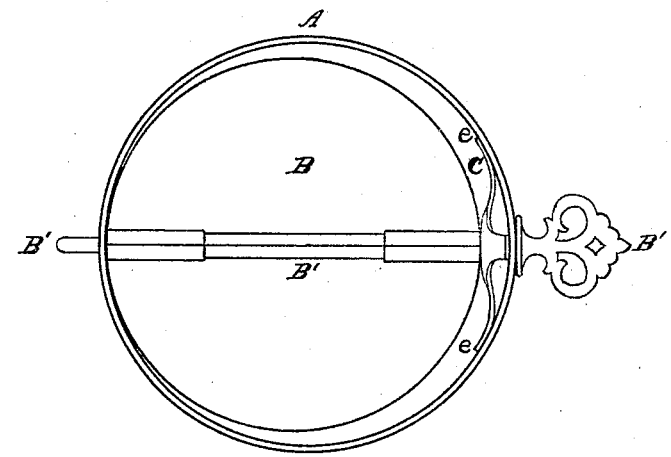
Figure 2:
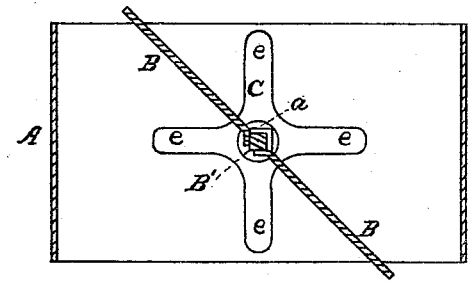
Figure 3:
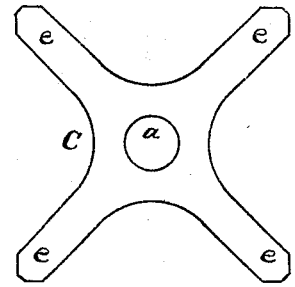

Figure 1 is a top view of a damper provided with my improvement; Fig. 2, a vertical section in the plane of the line $x\,x$; and Fig. 3, a front elevation of one part of the damper detached.

Like letters of reference indicate like parts.

In the drawing, A represents a stove-pipe. B B' is an ordinary stove-pipe damper, the part B' being capable of being withdrawn from the part B, and from the stove-pipe. C is a spring, formed in the manner shown, and made of sheet metal. $a$ is an opening in the center of the spring C, for the purpose of receiving the part B', and is enough larger than the said part to allow the latter to be turned freely therein. The arms $e\,e$ are so bent that their ends will not lie in the same plane with the opening $a$, when no pressure is exerted upon them. The manner of binding the arms $e\,e$ is represented in Fig. 1; a pressure, however, is exerted upon them when they are arranged as there shown. I arrange the spring C upon the part B', and between the stove-pipe and the part B. It is immaterial upon which end of the part B' the spring is arranged. The action of the spring crowds the part B firmly against the stove-pipe, as represented in Fig. 1, and the friction thus created retains the damper in any position in which it may be turned. The spring, when constructed in the manner shown and described, is not liable to be shifted from its position, so as to weaken its force, by being acted upon by the damper when the latter is turned. Should the spring be turned, the pressure upon the vertical arms is increased as the pressure upon the horizontal arms is diminished, and the pressure is then always even, or nearly so. This uniform action of the spring, in whatever position its arms may be arranged, results from the cylindrical form of the pipe.

I am aware that a spiral spring has heretofore been arranged on the outer part of the stem or spindle of the damper, for the purpose of crowding the damper against the pipe with sufficient force to prevent the diaphragm from being accidentally moved from its position after being set, and such a spring, so arranged and operating, is shown in the patent to N. W. Wheeler, issued February 2, 1864, and numbered 41,457, but I here make no claim thereto. I am also aware that a spiral spring arranged upon the spindle of the damper is shown in the patent to Ira S. Bullard, issued April 16, 1867, and numbered 63,850; but this spring is employed to hold in place a sliding and slotted plate, hung freely upon the spindle and external to the pipe, and a spring index-hand is employed to retain the damper in position, and is rigidly attached to the outer part of the spindle, and provided with a pointed stud resting in a series of depressions, which prevent the hand from being accidentally moved; but I here make no claim to either of the springs last referred to.

Having thus described my invention, what I claim as new, and desire to secure by Letters Patent, is—

In combination with a stove-pipe damper, the spring C, arranged on the spindle B', and between the diaphragm or disk B and the inner surface of the pipe, and consisting of the bent and yielding arms $e\,e$, radiating from the opening $a$, substantially as and for the purpose specified.

JAMES M. HORTON.

Witnesses:
F. F. WARNER,
N. C. GRIDLEY.